United States Patent
Colgrove et al.

(10) Patent No.: US 10,678,754 B1
(45) Date of Patent: Jun. 9, 2020

(54) PER-TENANT DEDUPLICATION FOR SHARED STORAGE

(71) Applicant: Pure Storage, Inc., Mountain View, CA (US)

(72) Inventors: John Colgrove, Los Altos, CA (US); Rajesh Kanungo, Mountain View, CA (US); Ronald Karr, Palo Alto, CA (US); Ethan L. Miller, Santa Cruz, CA (US)

(73) Assignee: Pure Storage, Inc., Mountain View, CA (US)

( * ) Notice: Subject to any disclaimer, the term of this patent is extended or adjusted under 35 U.S.C. 154(b) by 197 days.

(21) Appl. No.: 15/494,360

(22) Filed: Apr. 21, 2017

(51) Int. Cl.
*G06F 16/174* (2019.01)
*G06F 16/22* (2019.01)
*G06F 16/23* (2019.01)

(52) U.S. Cl.
CPC ...... *G06F 16/1748* (2019.01); *G06F 16/2237* (2019.01); *G06F 16/2255* (2019.01); *G06F 16/2365* (2019.01)

(58) Field of Classification Search
CPC ......... G06F 17/30156; G06F 17/30324; G06F 17/30371; G06F 17/3033; G06F 16/1748; G06F 16/2365; G06F 16/2255; G06F 16/2237
See application file for complete search history.

(56) References Cited

U.S. PATENT DOCUMENTS

| | | | | |
|---|---|---|---|---|
| 8,190,835 B1 * | 5/2012 | Yueh | ................. | G06F 3/0608 711/159 |
| 9,602,283 B1 * | 3/2017 | Chandra | ............ | G06F 16/1748 |
| 10,078,451 B1 * | 9/2018 | Floyd | ................. | G06F 3/0608 |
| 2013/0311433 A1 * | 11/2013 | Gero | ................. | G06F 17/30156 707/692 |
| 2016/0004716 A1 * | 1/2016 | Akirav | ............... | G06F 16/1748 707/692 |
| 2016/0154839 A1 * | 6/2016 | Bezawada | ........... | G06F 16/2365 707/692 |
| 2016/0350325 A1 * | 12/2016 | Wang | ................. | G06F 16/1748 |

* cited by examiner

*Primary Examiner* — Robert W Beausoliel, Jr.
*Assistant Examiner* — Mohammad Solaiman Bhuyan

(57) ABSTRACT

A storage controller coupled to a multi-tenant storage array receives a request from a client device to write a data block to a volume resident on the storage array, wherein the client device is associated with a tenant of the storage array. The storage controller determines a tenant identifier associated with the tenant, generates a hash value for the data block based at least in part on the data block and the tenant identifier, and performs at least one data deduplication operation on the data block using the hash value by determining whether the hash value matches with any of the plurality of previous hash values that are identified in a deduplication map. Responsive to determining that the hash value does not match with any of the plurality of previous hash values that are identified in the deduplication map, the hash value is stored in the deduplication map.

18 Claims, 10 Drawing Sheets

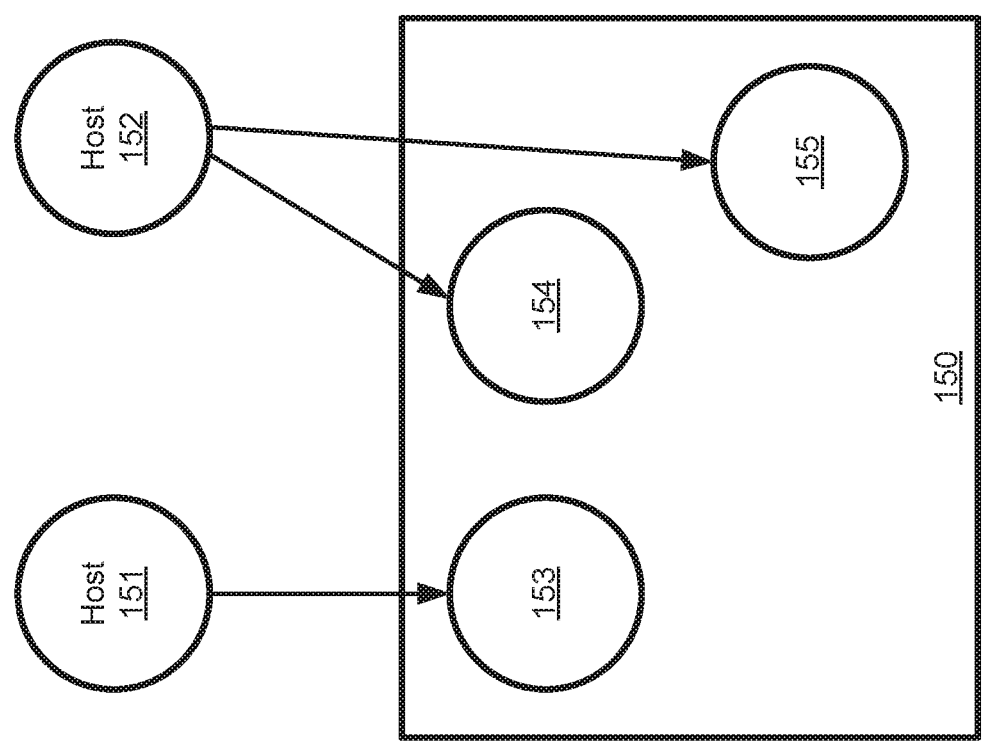

PER-TENANT DEDUPLICATION FOR SHARED STORAGE

BACKGROUND

Data deduplication is a process to eliminate or remove redundant data to improve the utilization of storage resources. For example, during the deduplication process, blocks of data may be processed and stored. When a subsequent block of data is received, the subsequent block of data may be compared with the previously stored block of data. If the subsequent block of data matches with the previously stored block of data, then the subsequent block of data may not be stored in the storage resource. Instead, a pointer to the previously stored block of data may replace the contents of the subsequent block of data.

BRIEF DESCRIPTION OF THE DRAWINGS

The present disclosure is illustrated by way of example, and not by way of limitation, in the figures of the accompanying drawings.

FIG. 1B is an example of a storage system with multiple tenants in accordance with some embodiments of the present disclosure.

DETAILED DESCRIPTION

Figure 1A:
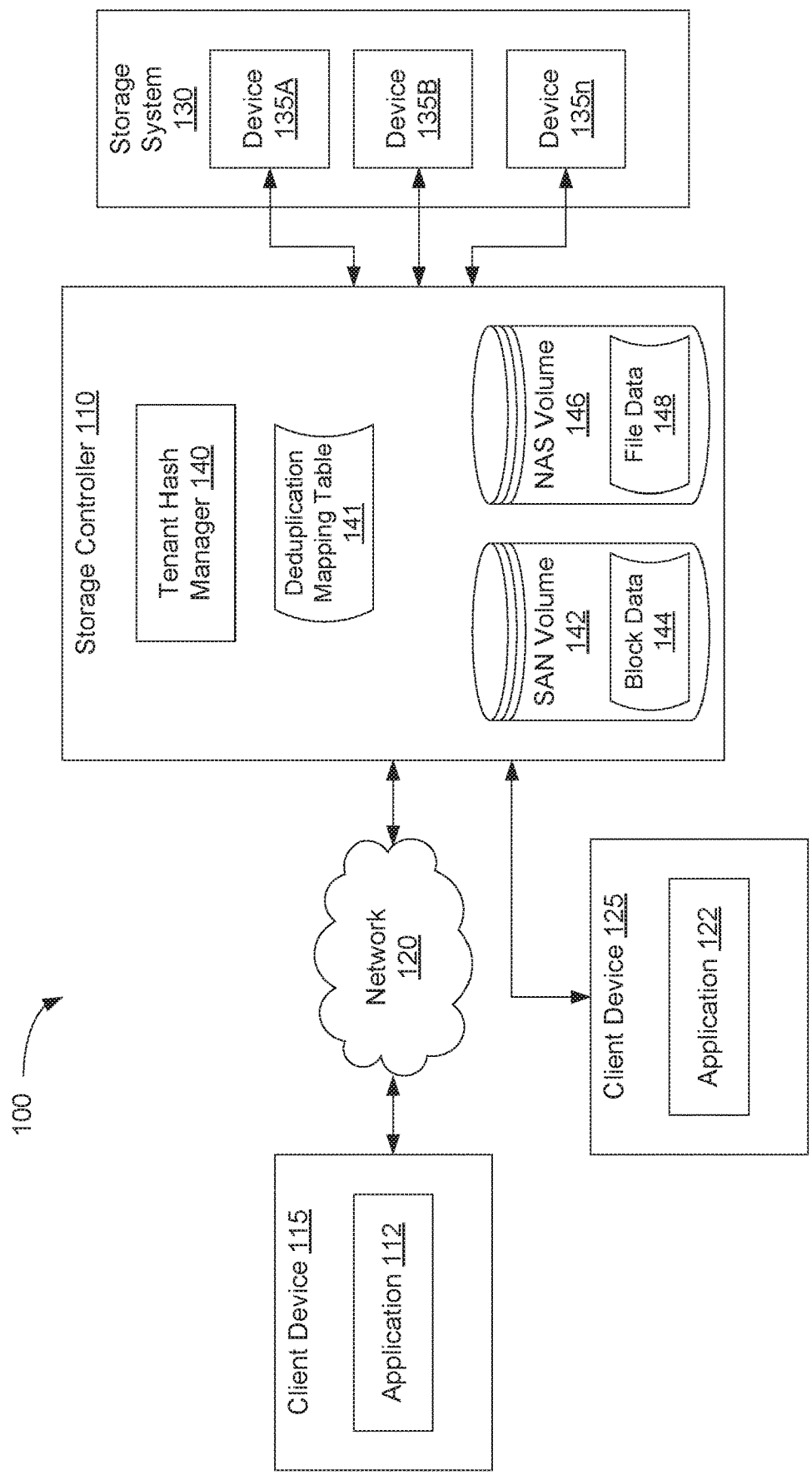
FIG. 1A is a block diagram illustrating a storage environment in which embodiments of the present disclosure may be implemented.

Aspects of the present disclosure relate to providing per-tenant data deduplication in a multi-tenant storage array. Many conventional distributed storage systems implement data deduplication techniques to identify a data block received in a write request to determine whether a duplicate copy of the data block is currently stored in the storage system. The deduplication process may use a hash function that generates a hash value based on the data block. The generated hash value may be compared with hash values of a deduplication map that identifies currently stored data blocks at the storage system. If the generated hash value matches with any of the hash values in the deduplication map, then the data block may be considered to be a copy or duplicate of another data block that is currently stored at the storage system.

While this type of technique can dramatically reduce the amount of data stored, it can present significant technical problems when applied to multi-tenant implementations. In general, a tenant may correspond to a dataset stored at a storage system and the multi-tenant implementation may store different tenants or datasets at the same storage system. Where multiple tenants are stored at the same storage system, security issues may arise that limit the ability of the storage system to intermingle the data of the multiple tenants. Often, a user that is accessing one tenant may not wish that their data at the tenant be compared to the data of another tenant that is accessed by another user, thus limiting global deduplication across all tenants of the storage system. For example, the comparing of the data of a first tenant that is accessed by a first user to the data of a second tenant that is accessed by a second user as a part of a deduplication process may provide the first user information of the second tenant that is accessed by the second user. Such information may correspond to an indication of a capacity of a storage system or a write performance of the storage system. As an example, the first user may provide a particular data to be stored at the storage system and if the deduplication process compares the particular data from the first user to the data of the second tenant that is accessed by the second user, then an indication of the capacity of the storage system or an indication of the write performance of the particular data to the storage system may be used to determine whether the second tenant includes a previous copy of the particular data. As a result, the first user may not have permission to access the second tenant, but may learn certain characteristics of the second tenant if the deduplication process compares data from the first user intended for the first tenant with data that is currently stored at the second tenant.

Some implementations remedy this by replicating portions of the storage system infrastructure so that separate instances of the deduplication subsystem may be maintained for each tenant. This, however, can increase costs since deduplication tables, processes, and other resources that perform the same tasks are maintained for each active tenant, which can present severe resource drains with large numbers of concurrent tenants.

Aspects of the present disclosure address the above and other deficiencies by implementing per-tenant data deduplication for a multi-tenant storage array. Data deduplication processing may be implemented on a macro level, utilizing a single infrastructure, across all tenants of the storage system by incorporating the use of a tenant identifier in the hashing process. Upon receipt of a request to write data to a multi-tenant storage array, the per-tenant deduplication system may identify the tenant identifier for the tenant to which the data is to be written. A tenant hash value may then be generated that incorporates the tenant identifier, and subsequently compared against other hash values stored in a deduplication table for the system. The incorporation of the tenant identifier into the tenant hash value can thus prevent deduplication across tenants since different tenants should not be associated with the same tenant identifier. The data may then be stored for each tenant on the same storage array without exposing a deduplication status of a tenant accessed by a user to another user that is accessing another tenant. Thus, in various implementations, the overhead of a multi-tenant storage array may be significantly reduced by eliminating the need to duplicate data structures and other software components for each tenant of the storage array.

Additionally, by incorporating the tenant identifier in the hashing process, management of the infrastructure for each tenant may be significantly improved.

In an illustrative example, a storage controller coupled to a multi-tenant storage array including one or more storage devices can receive a request from a client device to write a data block to a tenant resident on a multi-tenant storage array. The storage controller determines a tenant identifier associated with the tenant, and generates a tenant hash value for the data block, where the tenant hash value is based on the contents of the data block combined with the tenant identifier. The storage controller maintains a deduplication map identifying previously generated hash values of previously received data blocks that are stored on the multi-tenant storage array. Such hash values that are based on a combination of the contents of the data block and the tenant identifier may be referred to as tenant hash values. The storage controller performs a data deduplication operation on the data block using the tenant hash value by determining whether the tenant hash value matches any of the previously generated hash values stored in the deduplication map. Responsive to determining that the tenant hash value does not match any of the previously generated hash values that are identified in the deduplication map, the storage controller stores the tenant hash value in the deduplication map, stores the data blocks in the multi-tenant storage array, and associates the newly-written address with the newly-stored data blocks. Responsive to determining that the tenant hash value matches a previously generated value in the deduplication map, the storage controller may associate the newly-written address with the previously-stored data.

FIG. 1A is a block diagram illustrating a storage environment 100. In general, storage environment 100 may include a storage controller 110 and a storage system 130, which is representative of any number of data storage systems or storage device groups. As shown, storage system 130 includes storage devices 135A-n, which are representative of any number and type of storage devices (e.g., hard drives, solid-state drives (SSDs), other forms of local or distributed persistent memory). Storage controller 110 may be coupled directly to client device 125 and storage controller 110 may be coupled remotely over network 120 to client device 115. Client devices 115 and 125 are representative of any number of clients which may utilize storage controller 110 for storing and accessing data in storage environment 100. It is noted that some systems may include only a single client device, connected directly or remotely, to storage controller 110.

In some implementations, storage system 130 may represent a multi-tenant storage array. A tenant may be a dataset stored in the storage system 130 as described in further detail with regard to FIG. 1B.

Storage controller 110 may include software and/or hardware configured to provide access to storage devices 135A-n. Although storage controller 110 is shown as being separate from storage system 130, in some embodiments, storage controller 110 may be located within storage system 130. Storage controller 110 may include or be coupled to a base operating system (OS), a volume manager, and additional control logic, such as a tenant hash manager 140, for implementing the various techniques disclosed herein.

Storage controller 110 may include and/or execute on any number of processing devices and/or specialized hardware devices (such as field-programmable gate arrays (FPGAs) or application-specific integrated circuits (ASICs) and may include and/or execute on a single host computing device or be spread across multiple host computing devices. In some embodiments, storage controller 110 may generally include or execute on one or more file servers and/or block servers. Storage controller 110 may use any of various techniques for replicating data across devices 135A-n to prevent loss of data due to the failure of a device or the failure of storage locations within a device. Storage controller 110 may also utilize any of various data reduction technologies for reducing the amount of data stored in devices 135A-n through use of one or more of various techniques such as data deduplication, data compression, zero removal, pattern removal, or the like.

In one embodiment, storage controller 110 may utilize logical volumes that are stored at the storage system 130 and may maintain a mapping table to facilitate a translation between a logical address and a physical address. A volume may be a single accessible storage area with a single file system, or in other words, a logical grouping of data treated as a single "unit" by a host. In one embodiment, storage controller 110 stores storage volumes 142 and 146. In other embodiments, storage controller 110 may store any number of additional or different storage volumes. In one embodiment, storage volume 142 may be a storage area network (SAN) volume providing block-based storage and the storage volume 146 may be a network-attached storage (NAS) volume providing file-based storage. The NAS volume 146 may include file data 148 organized according to an installed file system.

In one embodiment, storage volumes 142 and 146 may be logical organizations of data physically located on one or more of storage devices 135A-n in storage system 130. The data associated with storage volumes 142 and 146 is stored on one or more locations on the storage devices 135A-n. A given request received by storage controller 110 may indicate at least a volume and block address or a file or file reference and a logical location within that file, and storage controller 110 may determine the one or more locations on storage devices 135A-n that relate to the given request.

In various embodiments, storage system 130 may be configured as object storage, where data is managed as objects. Additionally, storage system 130 may be configured as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in any other manner.

In one embodiment, storage controller 110 includes tenant hash manager 140 to facilitate per-tenant deduplication on multi-tenant storage system 130. Tenant hash manager 140 may receive a request to write data (e.g., one or more data blocks) to logical storage (e.g., a SAN volume, a NAS file system, object namespace, etc.) resident on multi-tenant storage system 130. In some implementations, the request may be received from a client device such as client device 115 or 125, where the client device accesses a tenant of the multi-tenant storage system 130.

In response to receiving the request, tenant hash manager 140 may then determine the tenant identifier associated with the tenant. In some implementations, tenant hash manager 140 may receive the tenant identifier with the request to write the data. Alternatively, tenant hash manager 140 may access a mapping table that stores a mapping between the tenant identifier and information associated with the request.

Tenant hash manager 140 may then generate a tenant hash value for the data blocks received in the request. The tenant hash value may be based at least in part on the contents of the data blocks and the tenant identifier. In some implementations, the tenant hash value may be generated by hashing the contents of the data blocks together with the value of the tenant identifier. In such cases, the tenant identifier may not be easily determined by inspecting the resulting tenant hash value, thus providing additional security for the tenant. In other implementations, the tenant hash value may be generated by first hashing the contents of the data block (without the tenant identifier). Tenant hash manager 140 may then append the tenant identifier to the high order bits, low order bits, or a middle group of bits of the hash of the data. Alternatively, tenant hash manager 140 may insert the tenant identifier into the hash of the data at a particular offset. Illustrative examples of the hashing methods are described below with respect to FIGS. 2 and 3A-3D.

After generating the tenant hash value for the received data blocks, tenant hash manager 140 may then perform at least one data deduplication operation on the received data blocks. As noted above, a data deduplication operation can eliminate or remove redundant data for the identified tenant prior to storing in multi-tenant storage system 130. To perform the deduplication operation, tenant hash manager 140 may access a deduplication mapping table 141 that stores previously generated hash values of previously received data blocks associated with the tenant. Tenant hash manager 140 may then determine whether the tenant hash value generated for the data blocks of the received request matches with any of the previously generated hash values stored in the deduplication map.

Tenant hash manager 140 may determine that it cannot readily identify that the tenant hash value for the data blocks matches any of the previously generated hash values for that tenant that are stored in the deduplication map. In such cases, tenant hash manager 140 may determine that the newly received data blocks are not duplicates of previously stored data blocks for that tenant, and may thus be stored in the multi-tenant storage system 130. Tenant hash manager 140 may then store the tenant hash value for the new data blocks in the deduplication map, and store the data blocks in the multi-tenant storage system 130.

Storage controller 110 may then associate the stored data with the logical volume (e.g., the SAN volume 142, NAS volume 146, etc.) specified by the write request received from the client device 115, 125. In some implementations, storage controller 110 may maintain this association in mapping tables that map a logical volume to one or more physical volumes of storage system 130.

Tenant hash manager 140 may determine that the tenant hash value for the data blocks of the received request matches a previously generated hash value stored in the deduplication map for that tenant. In such cases, tenant hash manager 140 may determine that the newly received data blocks are duplicates of previously stored data blocks for that tenant, and thus may not need to be stored in the multi-tenant storage system 130. Tenant hash manager 140 may instead generate a reference to associate the logical address of the newly received data blocks with the previously stored data blocks. Thus, a subsequent read of the logical address specified by the write request may refer to the previously stored data.

In various embodiments, multiple mapping tables may be maintained by storage controller 110. For example, the storage controller 110 may include an address translation table with multiple entries, where each entry holds a virtual-to-physical mapping for a corresponding data component. This mapping table may be used to map logical read/write requests from each of the client devices 115 and 125 to physical locations in storage devices 135A-n.

In alternative embodiments, the number and type of client computers, initiator devices, storage controllers, networks, storage arrays, and data storage devices is not limited to those shown in FIG. 1A. At various times one or more clients may operate offline. In addition, during operation, individual client computer connection types may change as users connect, disconnect, and reconnect to storage environment 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, and wide area network (WAN) connections such as the Internet, a router, storage area network, Ethernet, and others. Network 120 may include one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, Infiniband, NVMe-F, PCIe and any other storage interconnect may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the devices 135A-n appear to the client devices 115 and 125 as locally attached storage.

Client devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, PowerPC®, SPARC®, or any other general-purpose instruction set architecture may be selected. The processor cores may access cache memory subsystems for data and computer program instructions. The cache subsystems may be coupled to a memory hierarchy including random access memory (RAM) and a storage device.

In one embodiment, client device 115 includes application 112 and client device 125 includes application 122. Applications 112 and 122 may be any computer application programs designed to utilize the data from block data 144 or file data 148 in storage volumes 142 and 146 to implement or provide various functionalities. Applications 112 and 122 may issue requests to read data from or write data to volumes 142 and 146 within storage environment 100. For example, as noted above, the request may be to write data to or read data from a logical volume (e.g., SAN volume 142 or NAS volume 146).

Thus, tenant hash manager 140 may use the techniques described herein to perform per-tenant deduplication on data received by the storage system 130. The technical advantage of stronger security across tenants in a multi-tenant environment may be maintained while additionally implementing the benefits of data deduplication within each tenant. Additionally, by incorporating tenant identification in the deduplication process, the complexity of a multi-tenant storage array may be significantly reduced by eliminating the need to duplicate data structures and software components for each tenant of the storage array. Maintaining the data for all tenants in the same architecture can thus leverage a single infrastructure to support multiple tenants without sacrificing data security or the efficiencies obtained via deduplication operations. Moreover, by incorporating the tenant identifier in the hashing process, management of the infrastructure for each tenant may be significantly improved.

FIG. 1B is an example of a storage system 150 with multiple tenants. In general, the storage system 150 of FIG. 1B may correspond to the storage system 130 of FIG. 1A.

As shown in FIG. 1B, the storage system 150 may store data for multiple tenants. For example, a first dataset may correspond to the first tenant 153, a second dataset may correspond to the second tenant 154, and a third dataset may correspond to the third tenant 155. Different client systems, hosts, or users may separately access the tenants 153, 154, and 155. For example, the first host 151 may be assigned permissions to access (e.g., read data from or write data to) the data of the first tenant 153. The second host 152 may be associated with a first file system that is assigned permissions to access the data of the second tenant 154 and a second file system that is assigned permissions to access the data of the third tenant 155. Thus, different file systems of different hosts may be associated with permissions to access different tenants at the same storage system.

Each of the tenants 153, 154, and 155 may be separately encrypted datasets. For example, the data of the tenant 153 may be encrypted based on a first key while the data of the other tenants 154 and 155 are also encrypted based on other keys. Thus, the data in each tenant 153, 154, and 155 may be separately encrypted by using a different key for each of the tenants 153, 154, and 155. As a result, the data of each of the tenants 153, 154, and 155 may be isolated or securely separated from the data of another tenant at the same storage system 150. In some embodiments, each of the tenants 153, 154, and 155 may correspond to separate datasets that are not encrypted.

In operation, the storage system 150 may receive data from one of the hosts 151 or 152 to store the received data at a respective tenant of the storage system 150. The received data may be encrypted. If the data is encrypted, then the host system 150 may decrypt the received encrypted data and then perform a deduplication operation with the decrypted data to determine whether a duplicate of the data is stored at the respective tenant. If the deduplication operation is used to determine that the received data is not a duplicate of other data stored at the respective tenant, then the data may be stored at the respective tenant. For example, the data may be encrypted again before storing the data at the respective tenant.

Figure 2:
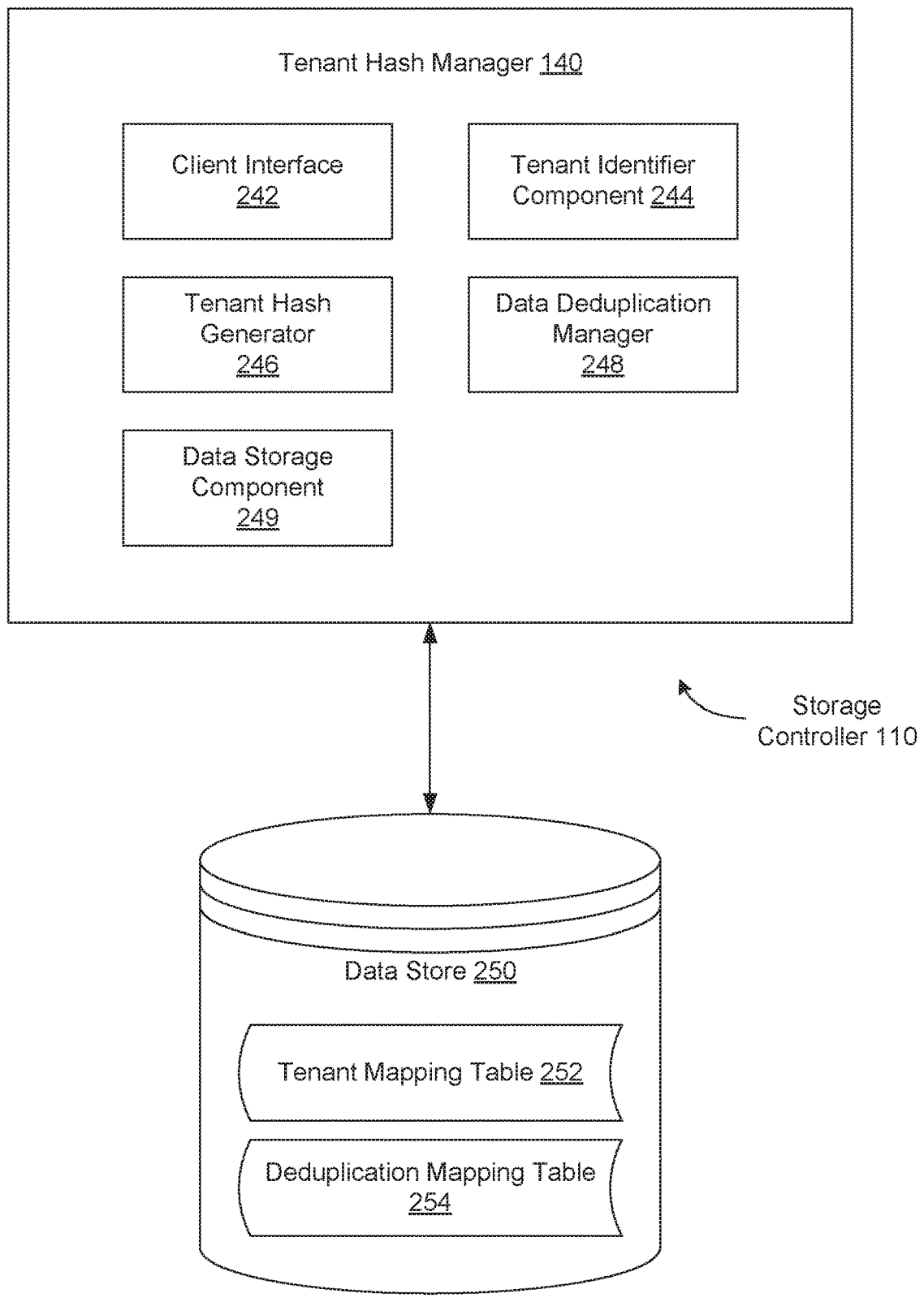
FIG. 2 is a block diagram illustrating per-tenant deduplication for a multi-tenant storage array, according to an embodiment.

FIG. 2 is a block diagram illustrating tenant hash manager 140 in a storage controller 110. In one embodiment, tenant hash manager 140 includes client interface 242, tenant identifier component 244, tenant hash generator 246, data deduplication manager 248, and data storage module 249. This arrangement of components may be a logical separation, and in other embodiments, these components can be combined together or separated in further components. In one embodiment, data store 250 is connected to tenant hash manager 140 and includes tenant mapping table 252 and deduplication mapping table 254. In another embodiment, tenant mapping table 252 and deduplication mapping table 254 may be located elsewhere. For example, tenant mapping table 252 and deduplication mapping table 254 may be stored in a different volume managed by storage controller 110 or may be stored in a memory of the storage controller 110.

In one embodiment, storage controller 110 may include tenant hash manager 140 and data store 250. In another embodiment, data store 250 may be external to storage controller 110 and may be connected to storage controller 110 over a network or other connection. In other embodiments, storage controller 110 may include different and/or additional components which are not shown to simplify the description. Data store 250 may include one or more mass storage devices which can include, for example, flash memory, magnetic or optical disks, tape drives, read-only memory (ROM), random-access memory (RAM), 3D XPoint, flash memory, or any other type of storage medium.

In one embodiment, client interface 242 manages communication with client devices in storage environment 100, such as client devices 115 or 125 of FIG. 1. Client interface 242 can receive I/O requests to access data storage volumes 142 and 146 from an application 112 or 122 over network 120. In one embodiment, an I/O request includes a request to write data (e.g., one or more data blocks) to a logical volume resident on multi-tenant storage system 130 (e.g., SAN volume 142, NAS volume 146, etc.). In some implementations, the request may be received from a client device that is associated with a tenant of the multi-tenant storage array.

In some implementations, the request may include additional data to identify the data such as a tenant identifier identifying the tenant to be accessed, a host identifier (identifying the host that submitted the request), an identification of an application that submitted the request, or other similar information.

The tenant hash manager 140 may then invoke tenant identifier component 244 to determine a tenant identifier associated with the tenant that sent the request (e.g., the tenant for which data of the request is intended to be stored). In some implementations, tenant hash manager 140 may receive the tenant identifier with the request to write the data or may identify the tenant identifier based on a permission of a user or host providing the request. Alternatively, tenant hash manager 140 may access tenant mapping table 251 that stores a mapping between the tenant identifier to information that may be received with the request.

Once the tenant identifier has been determined, tenant hash generator 246 may be invoked to generate a tenant hash value for the data received in the request. The tenant hash value may be generated based on the contents of the data blocks in the request and the tenant identifier. In some implementations, the tenant hash value may be generated by appending the tenant identifier to a hash of the data blocks from the request. Tenant hash generator 246 may first perform a hash function on the data block(s) to generate an initial hash value of the contents of the decrypted data blocks. Then, tenant hash generator 246 may append the tenant identifier to the initial hash value.

In one embodiment, tenant hash generator 246 may append the tenant identifier to the high order bits (the most significant digits) of the initial hash value. Thus, the resulting tenant hash value can begin with the tenant identifier, so hash entries stored in a deduplication table may be easily segregated according to the tenant identifier. Subsequent maintenance of the deduplication table for a particular tenant may thus be optimized since the entries for a tenant are stored together. An example of this type of tenant hash value is described below with respect to FIG. 3A. In an alternative embodiment, rather than append the tenant identifier to the high order bits, tenant hash generator 246 may overwrite a portion of the high order bits of the initial hash value with the tenant identifier.

In another embodiment, tenant hash generator 246 may append the tenant identifier to the low order bits (the least significant digits) of the initial hash value. Thus, the resulting tenant hash value can end with the tenant identifier, so hash entries stored in a deduplication table may be organized to identify data duplicated across clients. An example of this type of tenant hash value is described below with respect to FIG. 3B. In an alternative embodiment, rather than append the tenant identifier to the low order bits, tenant hash generator 246 may overwrite a portion of the low order bits of the initial hash value with the tenant identifier.

In another embodiment, tenant hash generator 246 may insert the tenant identifier into the initial hash value at a particular offset within the initial hash value. For example, the tenant identifier may be inserted at an offset of 10 bits into the initial hash value. An example of this type of tenant hash value is described below with respect to FIG. 3C. In an alternative embodiment, rather than insert the tenant identifier, tenant hash generator 246 may overwrite a portion of the initial hash value with the tenant identifier at the determined offset. In another embodiment, the tenant hash generator 246 may perform an exclusive-or (XOR) operation between the tenant identifier and the initial hash value. For example, the XOR operation may be performed with the tenant identifier and the lower order bits of the initial hash value or another group of bits of the hash value based on the particular offset. Such an embodiment may consume less space while preserving more of the bit values of the initial hash value.

In some implementations, tenant hash generator 246 may generate the tenant hash value by hashing the contents of the data blocks with the value of the tenant identifier. In such cases, the tenant identifier may not be easily determined by inspecting the resulting tenant hash value, thus providing additional security for the tenant. In one embodiment, tenant hash generator 246 may perform a hash function on the received data block(s) and the tenant identifier to generate the tenant hash value. In another embodiment, tenant hash generator 246 may perform one hash function on the data block(s) to generate an initial hash value and then perform a second hash function on the initial hash value and the tenant identifier to generate the tenant hash value. An example of this type of tenant hash value is described below with respect to FIG. 3D.

After the tenant hash value has been generated for the received data blocks, data deduplication manager 248 may be invoked to perform at least one data deduplication operation on the received data block(s). To perform the deduplication operation, deduplication manager 248 may access a deduplication mapping table 252 that stores previously generated hash values of previously received data blocks associated with the tenant. Data deduplication manager 248 may then determine whether the tenant hash value generated for the data block(s) of the received request matches with any of the previously generated hash values stored in the deduplication map.

In one embodiment, responsive to determining that the tenant hash value does not match with any of the previous hash values that are stored in the deduplication mapping table 252, data deduplication manager 248 may perform operations to store the received data in the storage array (e.g., the received data is not duplicate data). Data deduplication manager 248 may store the tenant hash value for the received data blocks in the deduplication mapping table 252 to be used for subsequently received write requests. Data deduplication manager 248 may then invoke data storage module 249 to store the data blocks in the multi-tenant storage system. In one embodiment, responsive to determining that the tenant hash value matches a previous hash value stored in the deduplication mapping table 252 for that tenant, data deduplication manager 248 may perform operations to avoid storing the duplicate data in the multi-tenant storage system (e.g., the received data is duplicate data). Data deduplication manager 248 may determine a physical location of a stored data block in the multi-tenant storage system that is associated with the matching hash value stored in deduplication mapping table 252. Data deduplication manager 248 may then determine a logical location of the volume associated with the received write request. Data deduplication manager 248 may then store a mapping of the logical location of the volume with the physical location of the previously stored data blocks. Thus, a subsequently received request to read data from the volume specified by the write request may access the previously stored data blocks.

In some implementations, deduplication manager 248 may perform a second portion or step of the deduplication operation in order to determine whether the data from the write request is a duplicate of data stored in the multi-tenant storage array. For example, responsive to determining that the tenant hash value matches a previously generated hash value stored in the deduplication mapping table 252, data deduplication manager 248 may then verify whether the data blocks in the received request are duplicates of data already stored in the storage array by comparing the received data blocks to stored data blocks. Data deduplication manager 248 may retrieve the stored data block(s) associated with the matching hash value from the deduplication mapping table 252, and then compare the stored data block(s) to the received data block(s). If the received data blocks match with the stored data blocks, then the data may be treated as duplicate data, and data deduplication manager 248 may perform the steps described above for duplicate data. If the received data blocks do not match with the stored data blocks, the data may not be treated as duplicate data, and data deduplication manager 248 may perform the steps described above for non-duplicated data.

Figure 3A:
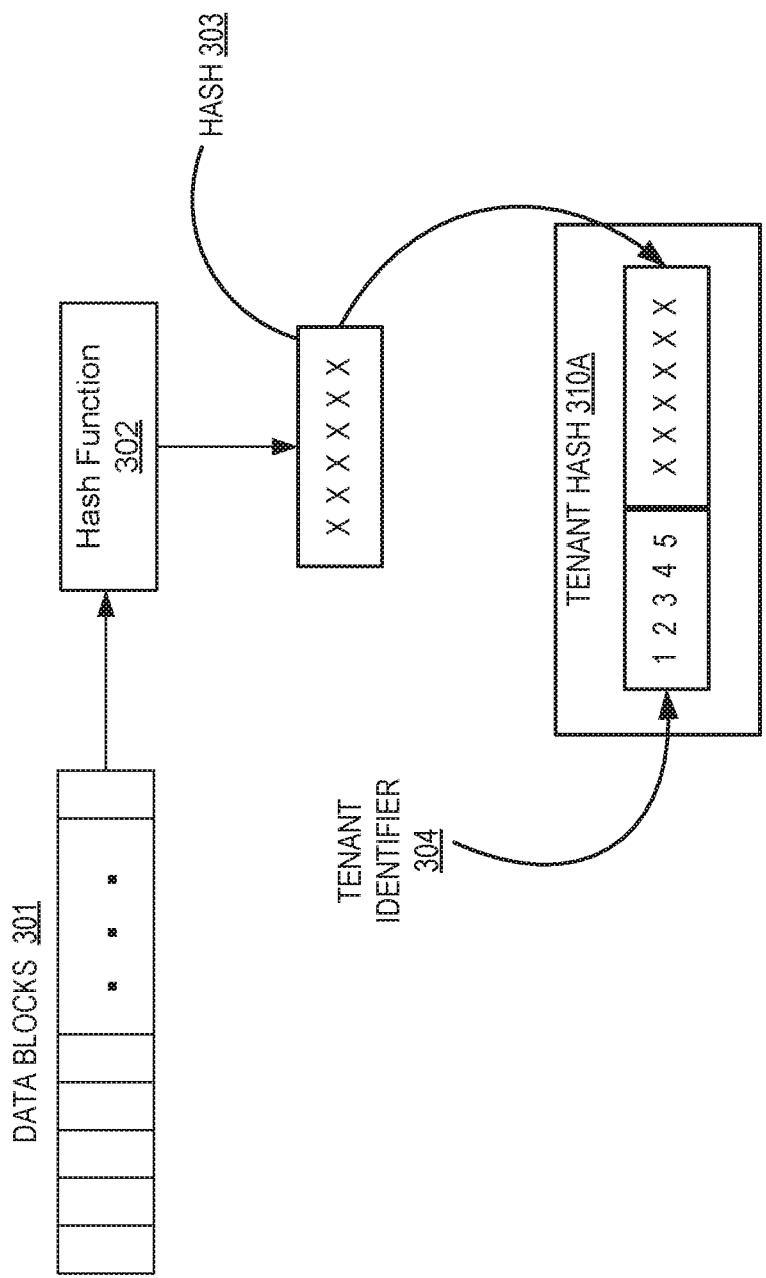
FIG. 3A is a block diagram illustrating an embodiment for generating a hash value based on a tenant identifier.

FIG. 3A is a block diagram illustrating an embodiment for generating a tenant hash value 310A based on a tenant identifier 304. As shown in FIG. 3A, tenant hash value 310A is generated by appending the tenant identifier 304 to the hash 303 of received data blocks 301. As described above, tenant hash manager 140 may receive a request to write data blocks 301 to the multi-tenant storage system. Tenant hash manager 140 may perform a hash function 302 on the data blocks 301 to generate an initial hash value 303. Tenant hash manager 140 may subsequently append the tenant identifier 304 to the high order (most significant) bits of the hash 303 to generate the tenant hash 310A.

Figure 3B:
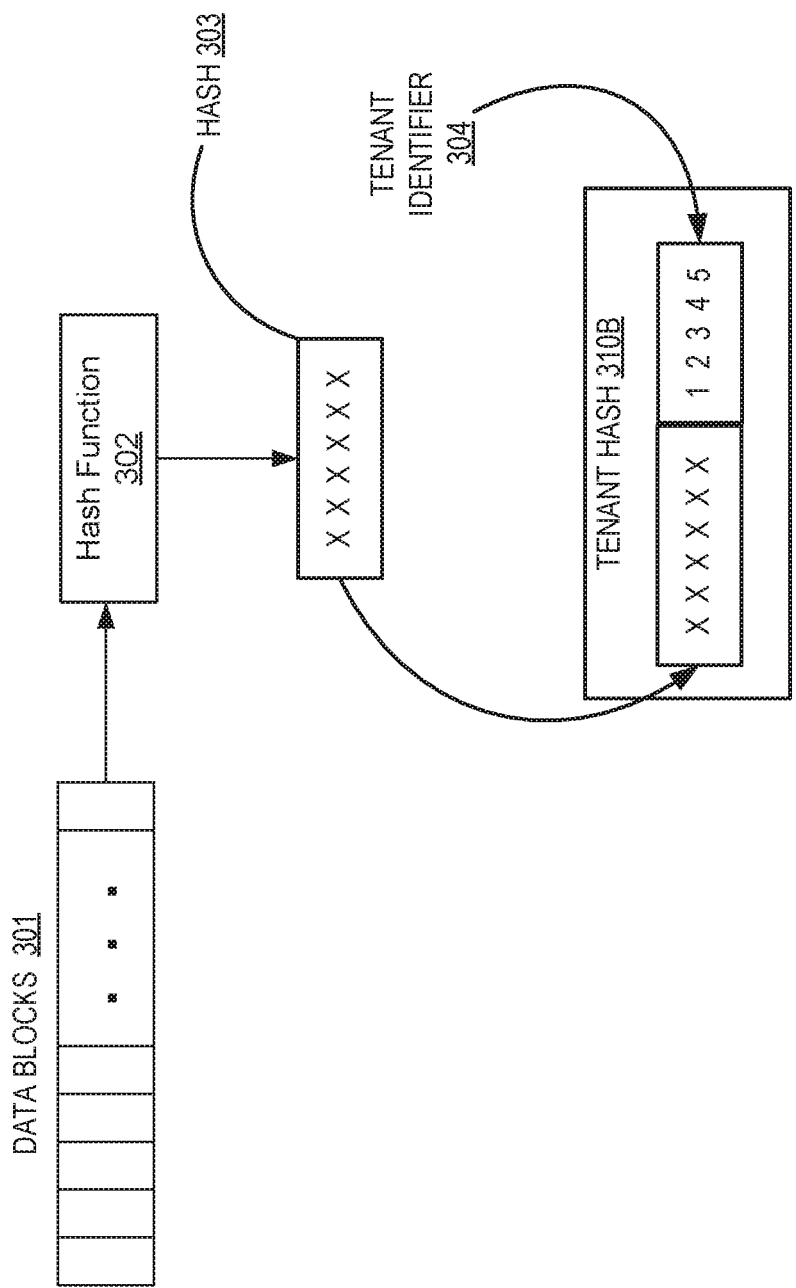
FIG. 3B is a block diagram illustrating an alternative embodiment for generating a hash value based on a tenant identifier.
Figure 3C:
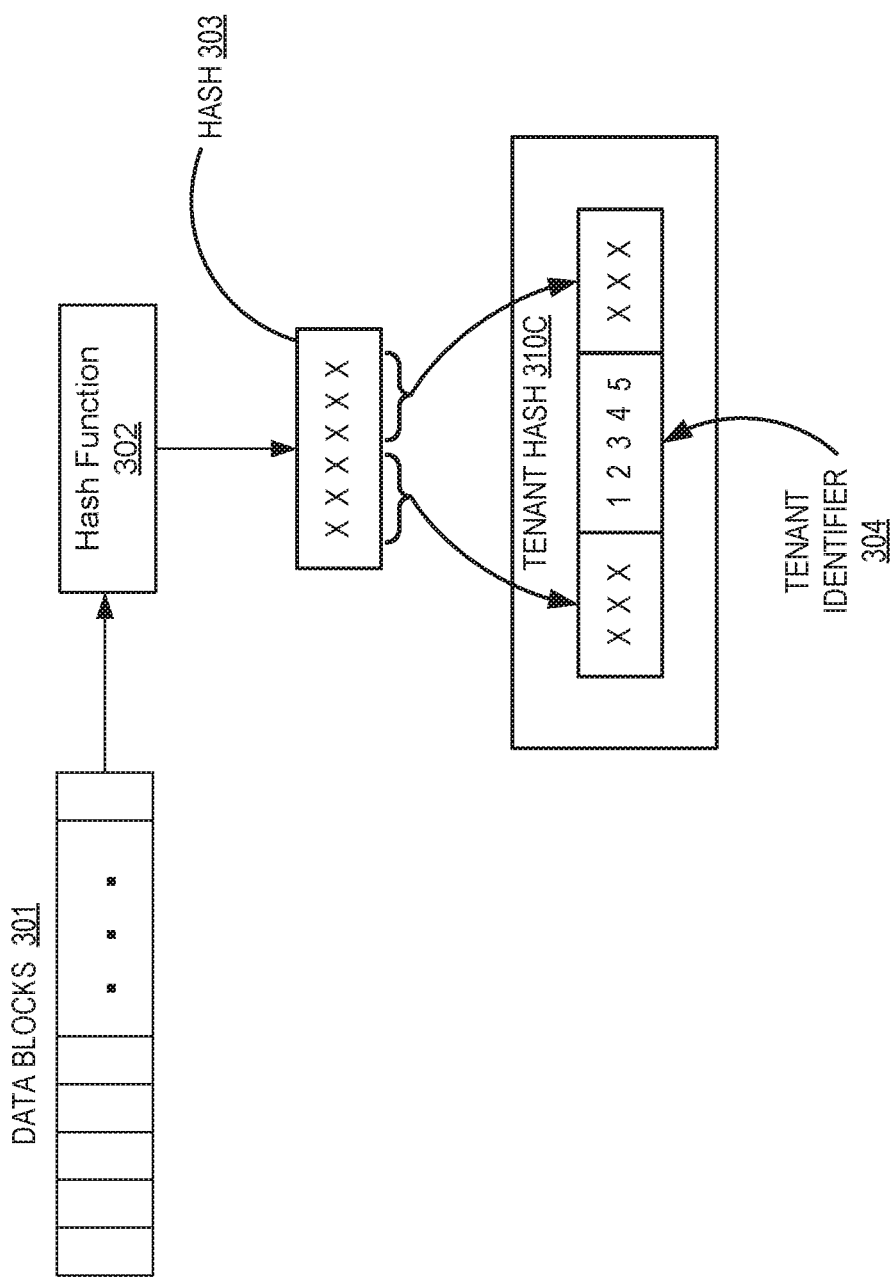
FIG. 3C is a block diagram illustrating an alternative embodiment for generating a hash value based on a tenant identifier.
Figure 3D:
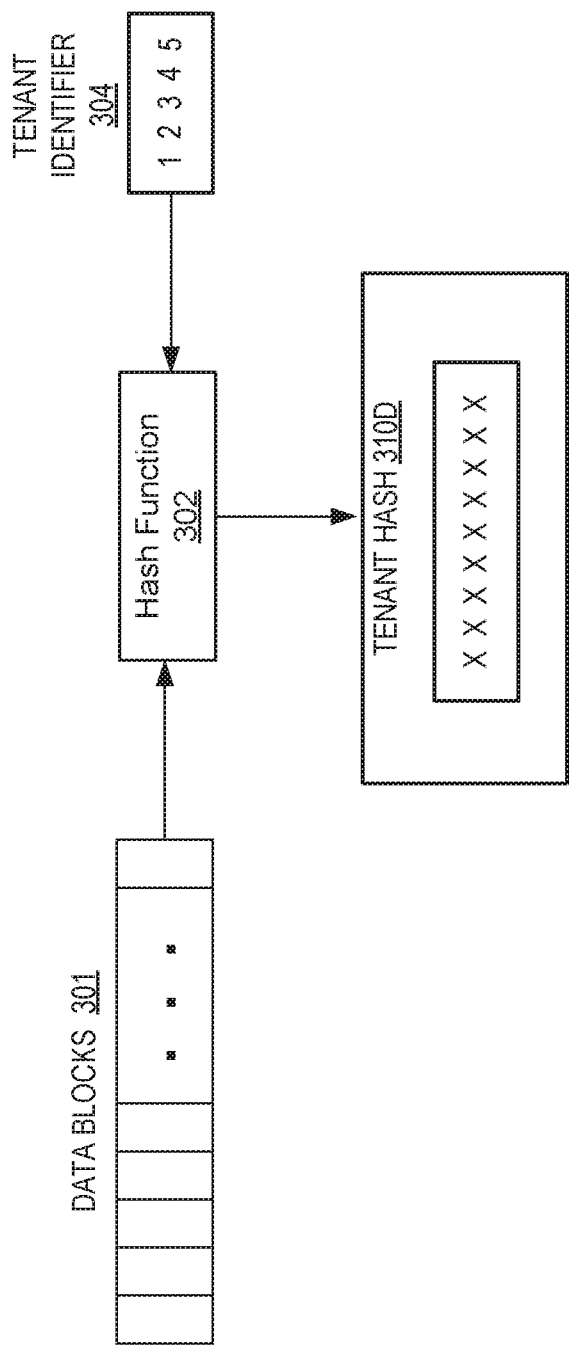
FIG. 3D is a block diagram illustrating an alternative embodiment for generating a hash value based on a tenant identifier.

FIG. 3B is a block diagram illustrating an additional embodiment for generating a hash value based on a tenant identifier. As shown in FIG. 3B, tenant hash value 310B is generated by appending the tenant identifier 304 to the low order (least significant) bits of the hash 303 to generate the tenant hash 310B. FIG. 3C is a block diagram illustrating an additional embodiment for generating a hash value based on a tenant identifier. As shown in FIG. 3C, tenant hash value 310C is generated by inserting the tenant identifier 304 into the hash 303 at an offset within hash 303. FIG. 3D is a block diagram illustrating an additional embodiment for generating a hash value based on a tenant identifier. As shown in FIG. 3D, tenant hash value 310D is generated by hashing the tenant identifier 304 with the received data blocks 301.

Figure 4:
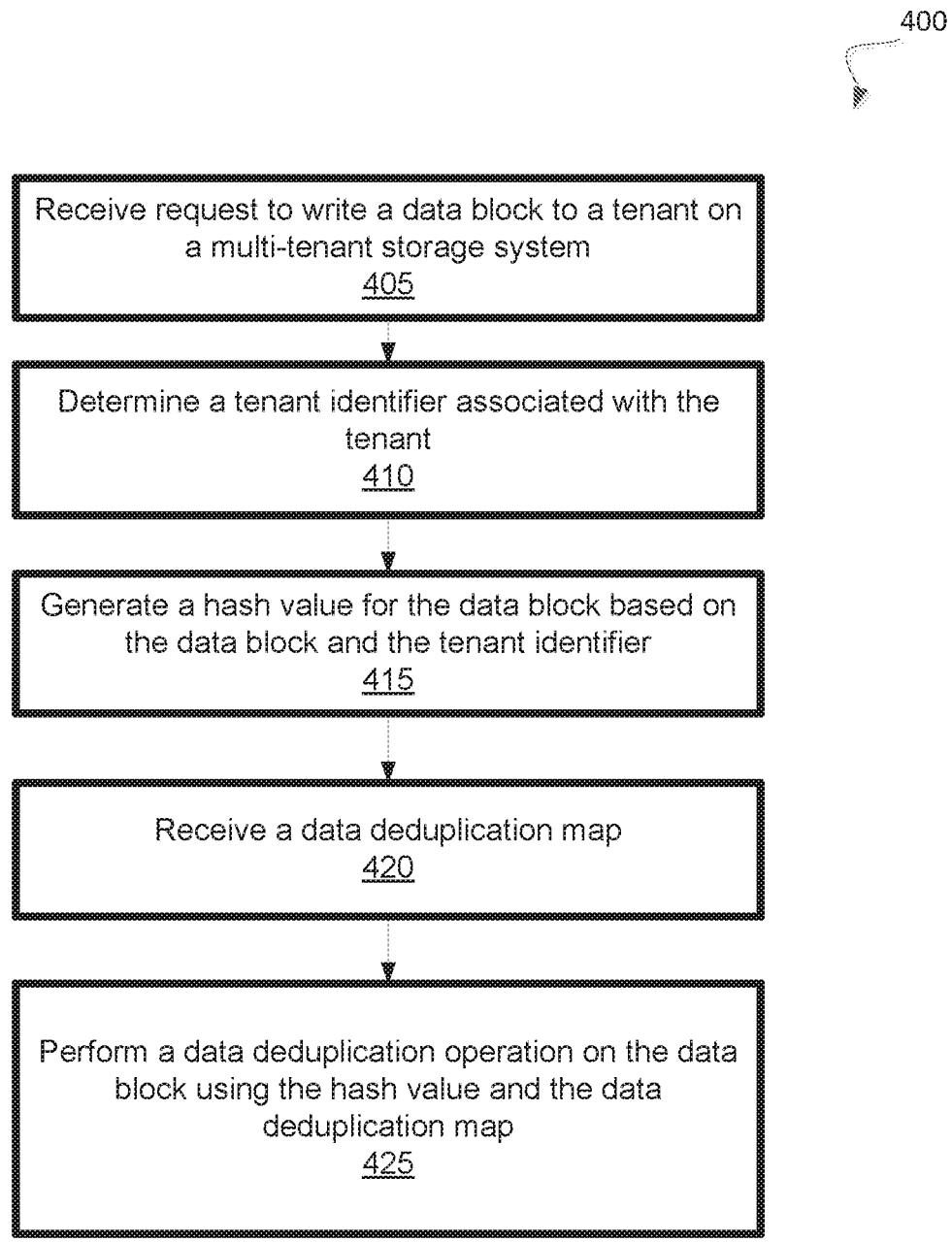
FIG. 4 is a flow diagram illustrating a method for per-tenant deduplication for a multi-tenant storage array according to an embodiment.

FIG. 4 is a flow diagram illustrating a method 400 for per-tenant deduplication for a multi-tenant storage array. The method 400 may be performed by processing logic that includes hardware (e.g., circuitry, dedicated logic, programmable logic, microcode, etc.), software (e.g., instructions run on a processing device to perform hardware simulation), or a combination thereof. In one embodiment, method 400 may be performed by tenant hash manager 140 of FIGS. 1 and 2.

Referring to FIG. 4, at block 405 of method 400, processing logic receives a request to write a data block to a tenant on a multi-tenant storage system. In some implementations, the request may be received from a client device associated with a permission to access the tenant of the multi-tenant storage system.

At block 410, processing logic determines a tenant identifier associated with the tenant. In some implementations, the tenant identifier may be assigned to a dataset stored at the multi-tenant storage system to which the data block from the client device is intended to be stored. In some implementations, the tenant identifier may be received with the request to write the data. Alternatively, processing logic may access a mapping table that stores a mapping between the tenant identifier and information received with the request.

At block 415, processing logic generates a tenant hash value for the data block based on the data block and the tenant identifier from block 410. The tenant hash value may be based at least in part on the contents of the data blocks received at block 405 and the tenant identifier determined at block 410. In some implementations, the tenant hash value may be generated by hashing the contents of the data blocks with the value of the tenant identifier. In other implementations, the tenant hash value may be generated by first hashing the contents of the data block (without the tenant identifier). Processing logic may then append the tenant identifier to the high or low order bits of the hash of the data. Alternatively, processing logic may insert the tenant identifier into the hash of the data at a particular offset.

At block 420, processing logic receives a data deduplication map identifying previous hash values of previously received data blocks that are stored on the multi-tenant storage array. The deduplication map may be stored on a storage device accessible to the storage system and may be used to determine whether the data blocks received at block 405 are duplicates of previously received data blocks already stored in the multi-tenant storage array. At block 425, processing logic performs at least one data deduplication operation on the data block using the hash value generated at block 415 and the data deduplication map. An illustrative example of a deduplication operation is described below with respect to FIG. 5. After block 425, the method 400 of FIG. 4 terminates.

Figure 5:
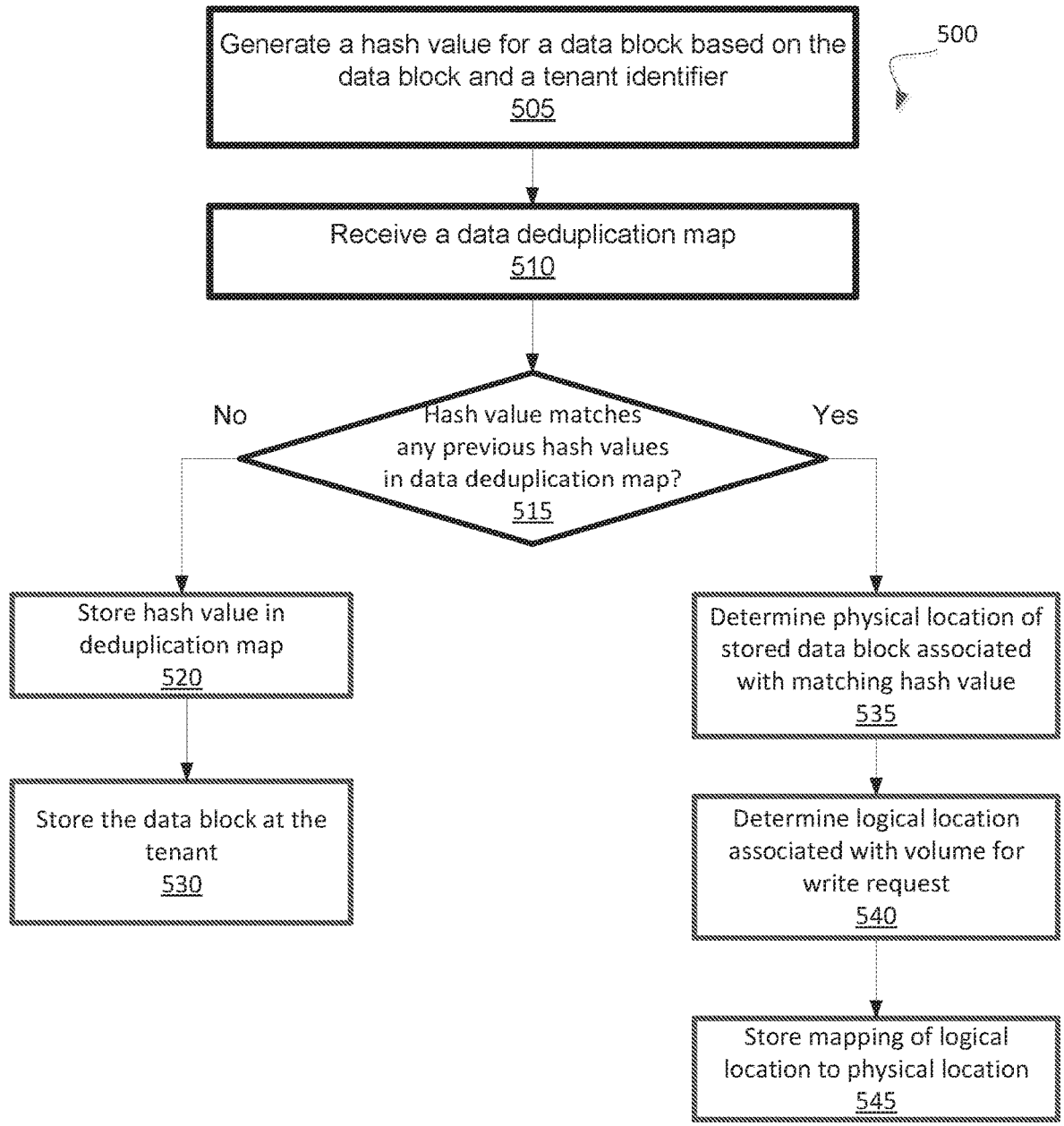
FIG. 5 is a flow diagram illustrating a method for a per-tenant deduplication operation according to an embodiment

FIG. 5 is a flow diagram illustrating a method 500 for a per-tenant deduplication operation. The method 500 may be performed by processing logic that includes hardware (e.g., circuitry, dedicated logic, programmable logic, microcode, etc.), software (e.g., instructions run on a processing device to perform hardware simulation), or a combination thereof. In one embodiment, method 500 may be performed by tenant hash manager 140 of FIGS. 1 and 2.

Referring to FIG. 5, at block 505 of method 500, processing logic generates a hash value for the data block received in a write request, where the hash value is based on the data block and the tenant identifier for the tenant that is to store one or more data blocks from the request. In some implementations, processing logic may generate the hash value as described above in block 415 of FIG. 4. At block 510, processing logic receives a data deduplication map identifying previous hash values of previously received data blocks that are stored on the multi-tenant storage array.

At block 515 processing logic determines whether the hash value generated at block 505 matches any previous hash values of previously received data blocks that are identified in the deduplication map. If not, processing logic continues to block 520. Otherwise, processing logic proceeds to block 535. At block 520, processing logic stores the hash value in the deduplication map. At block 530, processing logic may store the data block at the tenant in the multi-tenant storage array. In some embodiments, the data block may be encrypted to generate an encrypted data block that is stored at the tenant. After block 530, the method of FIG. 5 terminates.

Figure 6:
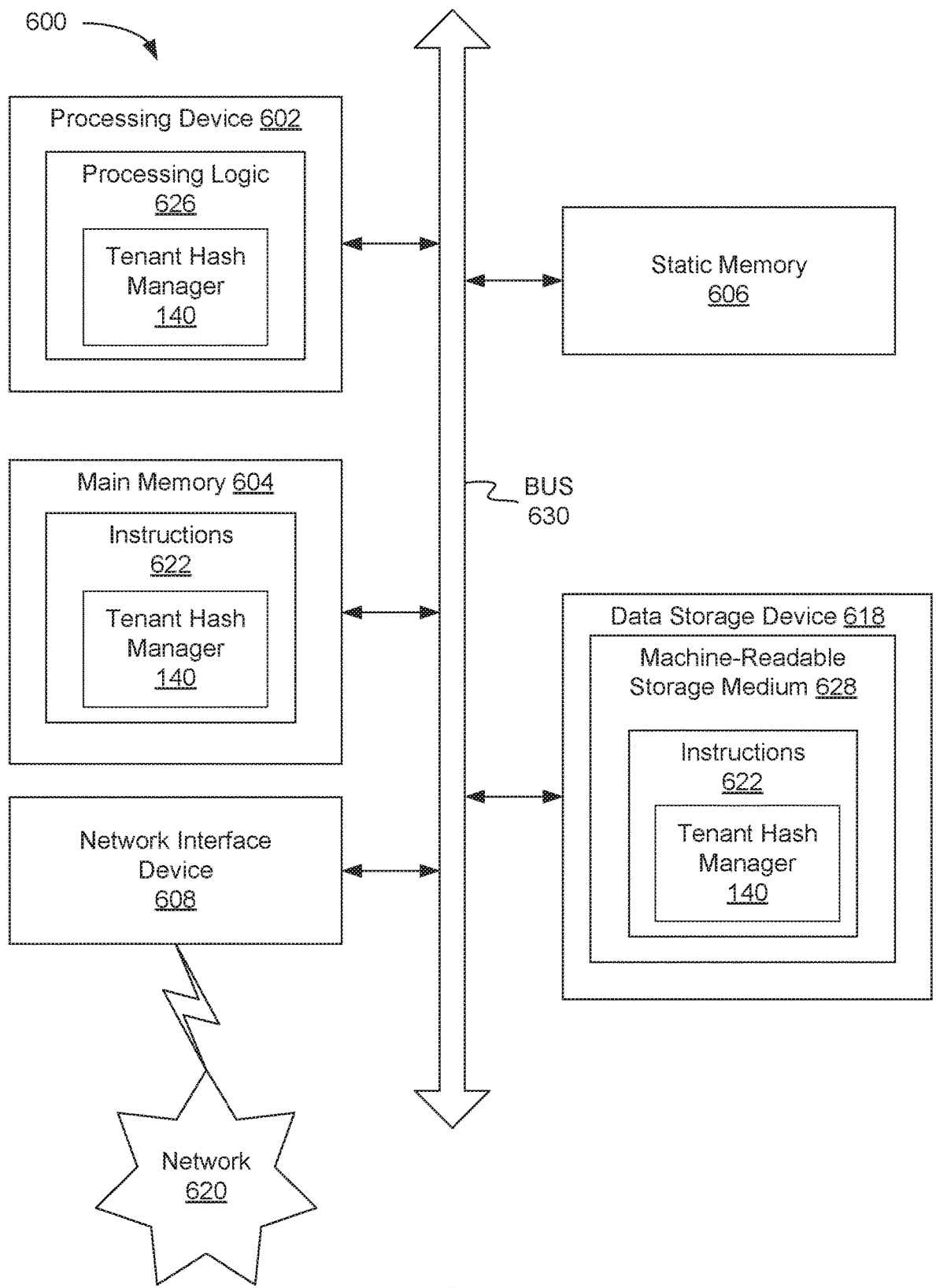
FIG. 6 is a block diagram illustrating an exemplary computer system according to an embodiment.

At block 535, processing logic determines the physical location of a stored data block that is associated with the matching hash value from the deduplication table. At block 540, processing logic determines a logical location associated with a volume for the received write request. At block 545, processing logic stores a mapping of the logical location to the physical location. After block 545, the method of FIG. 5 terminates FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as storage controller 110 running tenant hash manager 140 or of a client device, such as client devices 115 or 125.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Data storage device 618 may be one example of any of the storage devices 135A-n in FIG. 1 or of data store 250 in FIG. 2. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of tenant hash manager 140 shown in FIGS. 1 and 2, or of application 112 or 122, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute tenant hash manager 140 or application 112 or 122. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for data refresh in a distributed storage system without corruption of application state, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Unless specifically stated otherwise, as apparent from the following discussion, it is appreciated that throughout the description, discussions utilizing terms such as "receiving," "determining," "generating," "performing," "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A system comprising:
 a multi-tenant storage array comprising one or more storage devices; and
 a storage controller operatively coupled to the storage array, the storage controller comprising a processing device, the processing device to:
 receive a request from a client device to write a data block to a volume resident on the multi-tenant storage array, wherein the request is associated with a first tenant of the multi-tenant storage array;
 determine a tenant identifier associated with the first tenant;
 generate a hash value for the data block, wherein to generate the hash value, the processing device is to: perform a first hash function on the data block to generate a first hash value and join the first hash value and the tenant identifier associated with the first tenant;
 receive a deduplication map identifying a plurality of previous hash values of previously received data blocks that are stored on the multi-tenant storage array, wherein the deduplication map corresponds to a plurality of tenants of the multi-tenant storage array;
 perform a data deduplication operation on the data block using the hash value by determining whether the hash value matches with any of the plurality of previous hash values that are identified in the deduplication map; and
 responsive to determining that the hash value does not match with any of the plurality of previous hash values that are identified in the deduplication map, store the hash value in the deduplication map.

2. The system of claim 1, wherein to generate the hash value, the processing device is to:
 append the tenant identifier to at least one of the high order bits of the first hash value, the low order bits of the first hash value, or a middle group of bits of the first hash value to generate the hash value.

3. The system of claim 1, wherein to generate the hash value, the processing device is to:
insert the tenant identifier into the first hash value at an offset location to generate the hash value.

4. The system of claim 1, wherein to generate the hash value, the processing device is to:
perform a second hash function on the first hash value and the tenant identifier to generate the hash value.

5. A method comprising:
receiving, by a processing device, a request to write a data block to a volume resident on a multi-tenant storage array, wherein the request is associated with a first tenant of the multi-tenant storage array;
determining a tenant identifier associated with the first tenant;
generating, by the processing device, a hash value for the data block, including performing a first hash function on the data block to generate a first hash value and joining the first hash value and the tenant identifier associated with the first tenant; and
performing at least one data deduplication operation on the data block using the hash value.

6. The method of claim 5, wherein generating the hash value comprises:
appending the tenant identifier to at least one of the high order bits of the first hash value or the low order bits of the first hash value to generate the hash value.

7. The method of claim 5, wherein generating the hash value comprises:
performing an exclusive-or (XOR) operation between the first hash value and the tenant identifier to generate the hash value.

8. The method of claim 5, wherein generating the hash value comprises:
inserting the tenant identifier into the first hash value at an offset location to generate the hash value.

9. The method of claim 5, wherein generating the hash value comprises:
performing a second hash function on the first hash value and the tenant identifier to generate the hash value.

10. The method of claim 5, wherein determining the tenant identifier comprises:
receiving the tenant identifier with the request to write a data block.

11. The method of claim 10, further comprising:
responsive to determining that the hash value matches at least one of the plurality of previous hash values that are identified in the deduplication map:
determining a physical location in the multi-tenant storage array of a stored data block associated with the least one of the plurality of previous hash values;
determining a logical location associated with the volume; and
storing a mapping of the logical location to the physical location.

12. The method of claim 10, further comprising:
responsive to determining that the hash value matches at least one of the plurality of previous hash values that are identified in the deduplication map:
retrieving a stored data block associated with the least one of the plurality of previous hash values;
comparing the data block with the stored data block;
responsive to determining that the data block does not match with the stored data block, storing the hash value in the deduplication map.

13. The method of claim 5, wherein determining the tenant identifier comprises:
accessing a mapping table that stores a mapping between the volume and the tenant identifier.

14. The method of claim 5, wherein performing the at least one data deduplication operation comprises:
receiving a deduplication map identifying a plurality of previous hash values of previously received data blocks that are stored on the multi-tenant storage array;
determining whether the hash value matches with any of the plurality of previous hash values that are identified in the deduplication map; and
responsive to determining that the hash value does not match with any of the plurality of previous hash values that are identified in the deduplication map: storing the hash value in the deduplication map;
encrypting the data block to generate an encrypted data block; and
storing the encrypted data block in the multi-tenant storage array.

15. A non-transitory computer readable storage medium storing instructions, which when executed, cause a processing device to:
receive a request to write a data block to a volume resident on a multi-tenant storage array, wherein the request is associated with a first tenant of the multi-tenant storage array;
determine a tenant identifier associated with the first tenant;
generate, by the processing device, a hash value for the data block, wherein to generate the hash value, the processing device is to: perform a first hash function on the data block to generate a first hash value and join the first hash value and the tenant identifier associated with the first tenant; and
perform at least one data deduplication operation on the data block using the hash value.

16. The non-transitory computer readable storage medium of claim 15, wherein to generate the hash value, the processing device is to:
append the tenant identifier to at least one of the high order bits of the first hash value or the low order bits of the first hash value to generate the hash value.

17. The non-transitory computer readable storage medium of claim 15, wherein to generate the hash value, the processing device is to:
insert the tenant identifier into the first hash value at an offset location to generate the hash value.

18. The non-transitory computer readable storage medium of claim 15, wherein to generate the hash value, the processing device is to:
perform a second hash function on the first hash value and the tenant identifier to generate the hash value.

* * * * *